US011982620B2

(12) United States Patent
Wang

(10) Patent No.: US 11,982,620 B2
(45) Date of Patent: May 14, 2024

(54) MULTI-CAPILLARY OPTICAL DETECTION SYSTEM

(71) Applicant: Life Technologies Corporation, Carlsbad, CA (US)

(72) Inventor: Shaohong Wang, Pleasanton, CA (US)

(73) Assignee: Life Technologies Corporation, Carlsbad, CA (US)

( * ) Notice: Subject to any disclaimer, the term of this patent is extended or adjusted under 35 U.S.C. 154(b) by 218 days.

(21) Appl. No.: 17/441,258

(22) PCT Filed: Mar. 17, 2020

(86) PCT No.: PCT/US2020/023202
§ 371 (c)(1),
(2) Date: Sep. 20, 2021

(87) PCT Pub. No.: WO2020/190969
PCT Pub. Date: Sep. 24, 2020

(65) Prior Publication Data
US 2022/0155225 A1    May 19, 2022

Related U.S. Application Data

(60) Provisional application No. 62/820,222, filed on Mar. 18, 2019.

(51) Int. Cl.
*G01N 21/64* (2006.01)
*G01N 21/17* (2006.01)
*G01N 21/33* (2006.01)

(52) U.S. Cl.
CPC ........... *G01N 21/645* (2013.01); *G01N 21/33* (2013.01); *G01N 2021/174* (2013.01); *G01N 2021/6463* (2013.01)

(58) Field of Classification Search
CPC ............... G01N 21/645; G01N 21/33; G01N 2021/174; G01N 2021/6463
See application file for complete search history.

(56) References Cited

U.S. PATENT DOCUMENTS 4,675,300 A * 6/1987 Zare ..................... G01N 21/645
                                                    204/603
5,413,686 A * 5/1995 Klein ............... G01N 27/44782
                                                    204/603

(Continued)

FOREIGN PATENT DOCUMENTS

DE      WO9961894 A1 * 12/1999 ........... G01N 21/253
EP      0 581 413 A2      2/1994

(Continued)

OTHER PUBLICATIONS

International Preliminary Report on Patentability issued in International Application No. PCT/US2020/023202 dated Sep. 30, 2021, 8 pages.

*Primary Examiner* — David P Porta
*Assistant Examiner* — Gisselle M Gutierrez

(57) ABSTRACT

An optical detection system for a capillary electrophoresis instrument is disclosed. The system includes an ultraviolet (UV) source and an absorption measurement optical path. In an embodiment, the optical path comprises a first plurality of optical elements arranged to obtain a plurality of respective UV beamlets from a UV beam emitted by the UV source and to direct the respective UV beamlets transversely through respective capillaries of a plurality of capillaries and to an absorption detector positioned to detect respective signals for use in obtaining respective UV absorption measurements corresponding to the respective capillaries.

18 Claims, 7 Drawing Sheets

(56) References Cited

U.S. PATENT DOCUMENTS

| | | | | |
|---|---|---|---|---|
| 5,922,184 A | * | 7/1999 | Binder | G01N 27/44721 |
| | | | | 702/22 |
| 5,926,271 A | * | 7/1999 | Couderc | G01N 21/05 |
| | | | | 356/318 |
| 2007/0131870 A1 | * | 6/2007 | Pang | G01N 27/44704 |
| | | | | 250/373 |
| 2011/0192725 A1 | * | 8/2011 | Madabhushi | G01N 27/44752 |
| | | | | 204/454 |
| 2011/0212446 A1 | * | 9/2011 | Wang | C12Q 1/6858 |
| | | | | 435/6.12 |
| 2014/0248692 A1 | * | 9/2014 | Lagace | G16B 20/00 |
| | | | | 702/19 |
| 2015/0330955 A1 | * | 11/2015 | Farnsworth | G01N 21/33 |
| | | | | 250/373 |
| 2018/0038827 A1 | * | 2/2018 | Ver Meer | G01N 27/44721 |
| 2018/0335408 A1 | * | 11/2018 | Farnsworth | G01N 21/3103 |
| 2020/0075129 A1 | * | 3/2020 | Wang | G16B 40/20 |
| 2022/0155225 A1 | * | 5/2022 | Wang | G01N 21/33 |
| 2022/0334055 A1 | * | 10/2022 | Wang | G01N 21/6452 |
| 2023/0266271 A1 | * | 8/2023 | Osawa | G01N 27/44743 |
| | | | | 204/601 |

FOREIGN PATENT DOCUMENTS

| | | |
|---|---|---|
| WO | 99/61894 A1 | 12/1999 |
| WO | 2015/134925 A1 | 9/2015 |

* cited by examiner

MULTI-CAPILLARY OPTICAL DETECTION SYSTEM

CROSS REFERENCE TO RELATED APPLICATIONS

This application is a U.S. National Phase application under 35 U.S.C. § 371 of International Application No. PCT/US2020/023202 filed on Mar. 17, 2020, which claims priority to U.S. Provisional Application No. 62/820,222 filed on Mar. 18, 2019. The entire content of these applications is hereby incorporated herein by reference.

FIELD OF THE DISCLOSURE

This disclosure relates generally to optical detection systems for capillary electrophoresis instruments.

BACKGROUND

Existing capillary electrophoresis instruments analyze samples using visible light or other electromagnetic sources to excite and measure fluorescence of a sample-filled capillary. Certain other capillary electrophoresis instruments analyze samples using ultraviolet (UV) sources to measure absorption of UV radiation by a sample-filled capillary.

SUMMARY

There is an increasing need for a high-throughput and high-quality capillary electrophoresis (CE) analysis platform. One way to efficiently increase throughput is by conducting measurements across a plurality of capillaries simultaneously. However, in the context of ultraviolet (UV) absorption measurements, prior methods have not achieved such measurement efficiently. Some embodiments of the present invention provide a multi-capillary CE optical detection system that efficiently provides UV absorption measurements across a plurality of capillaries using a single UV source. For certain types of samples, e.g., proteins, combining multiple types of electromagnetic measurements in a single system would be especially useful. Some embodiments provide multiple types of measurements in a single system. In one embodiment, optical paths allow use of a single UV source for both UV absorption measurements and for exciting and measuring UV fluorescence. In another embodiment, optical paths allow using two different UV sources to measure UV absorption at different wavelengths. Some embodiments also include an optical path for using a visible light source to excite and measure fluorescence. In some embodiments, point sources are used and a digital signal processing unit utilizes signals from a reference capillary to remove source and capillary noise from signals corresponding to sample-filled capillaries. In some embodiments, the system is particularly applicable to measuring protein samples. In some embodiments, the system is applicable to other types of samples. These and other embodiments and variations thereof are more fully described below.

Various other aspects of the inventive subject matter will become more apparent from the following description, along with the accompanying drawings.

BRIEF DESCRIPTION OF THE DRAWINGS

FIG. 7 illustrates signals from the detectors shown in FIGS. 1-6 and input to the digital signal processing unit shown in FIG. 1. FIG. 7 also illustrates signals output by the digital signal processing unit.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Figure 1:
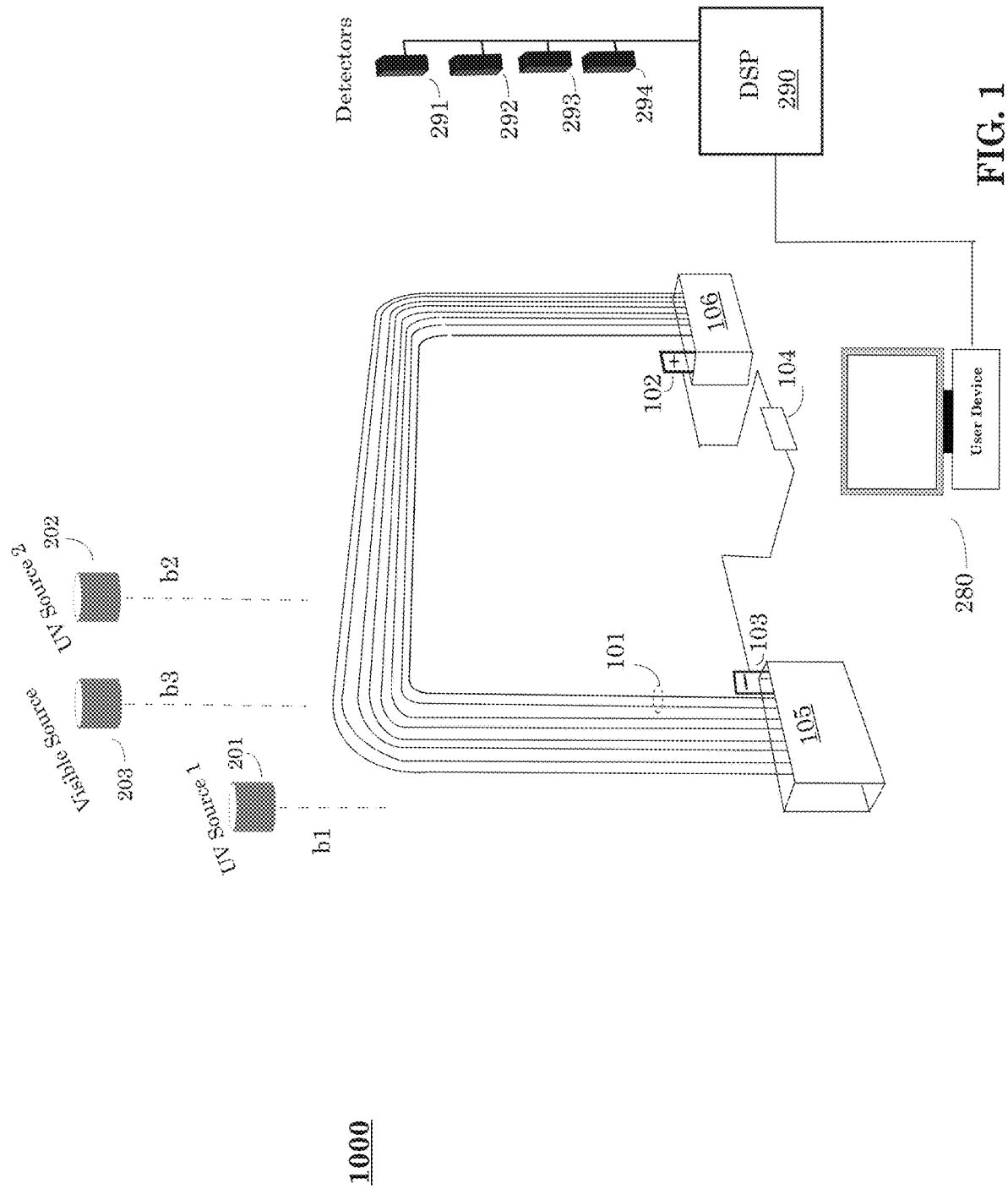
FIG. 1 is a high-level diagram illustrating portions of a sample separation and identification instrument including an optical detection system in accordance with one embodiment of the present invention.

FIG. 1 is a high-level diagram illustrating portions of a sample separation and identification instrument 1000 including an optical detection system in accordance with one embodiment of the present invention. In the illustrated embodiment, instrument 1000 is a capillary electrophoresis (CE) instrument comprising at least one capillary 101 having an outer capillary diameter and an inner capillary channel diameter of a capillary channel through which a sample or other liquid may flow.

Figure 2:
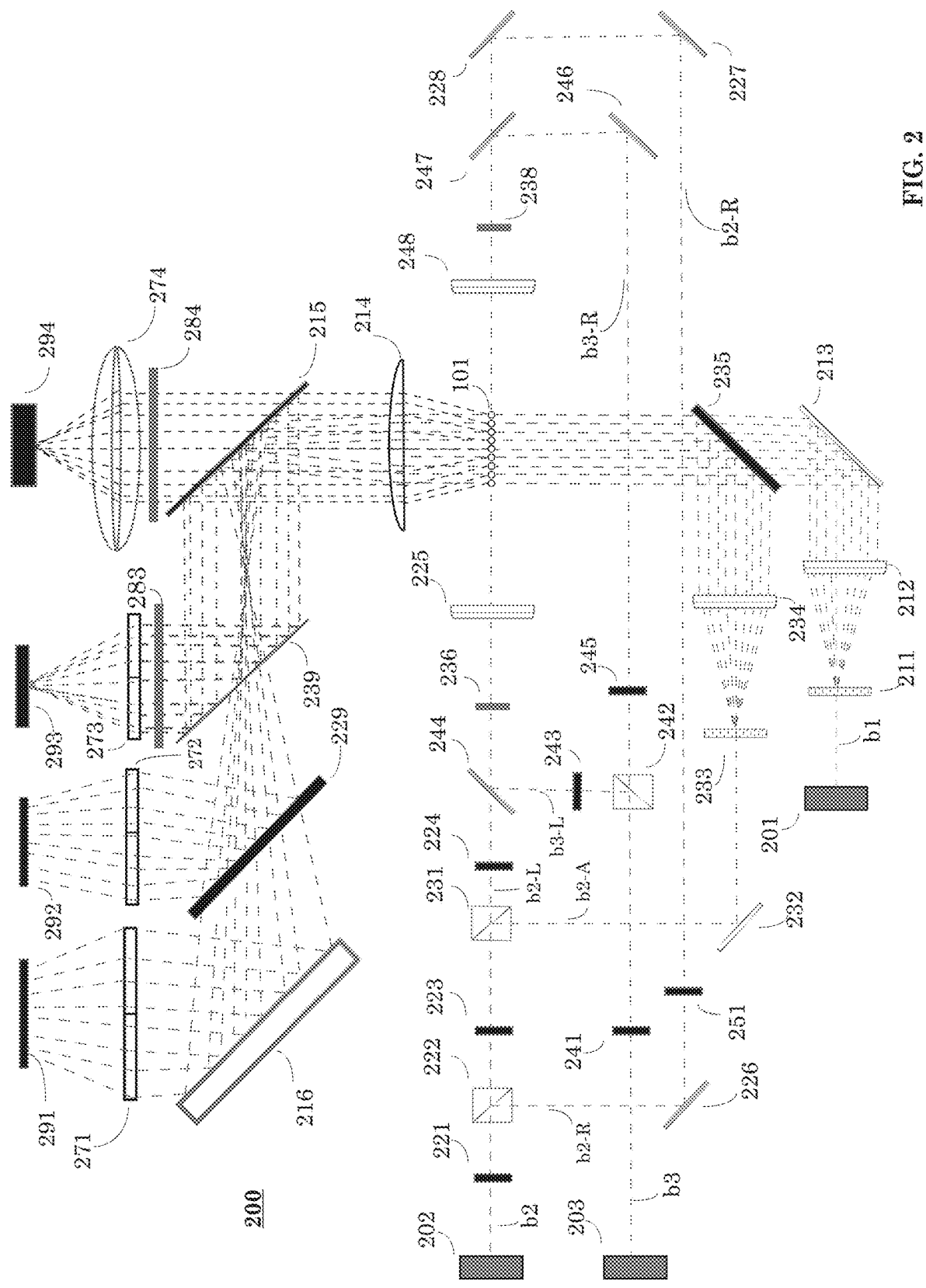
FIG. 2 illustrates an embodiment of the optical detection system of the embodiment of FIG. 1.

With additional reference to FIG. 2, instrument 1000 comprises an optical detection system 200 comprising sources 201, 202, and 203. As used herein, unless otherwise indicated or implied, "source" refers to a source of electromagnetic radiation, for example, a source of ultra-violet (UV) radiation, visible light, near-infrared, and/or infrared radiation. The terms "UV source" and "UV light source" will be used interchangeably herein to mean a source producing radiation primarily or exclusively within UV band of the electromagnetic spectrum, e.g., from about 10 nanometers ("nm") to 400 nm. As used herein the term "visible light source" means a source producing radiation primarily or exclusively within visible light band of the electromagnetic spectrum (e.g., from about 380 nm to 740 nm).

In the illustrated embodiment, source 201 comprises a first UV source providing UV beam b1 having a first wavelength or wavelength band and source 202 comprises a second UV source providing UV beam b2 having a second wavelength or wavelength band. Source 203 may be a visible light source 203 providing visible light beam b3. In one embodiment, beam b1 has a nominal or peak output at a wavelength that is at or near 220 nm and beam b2 has a nominal or peak output at a wavelength that is at or near 280 nm. In alternative embodiments, these wavelengths might be different without departing from the spirit and scope of the invention. In a preferred embodiment, UV sources 201 and 202 each comprise a UV laser or similar UV source. In certain embodiments, sources 201 and 202 may comprise a deuterium lamp, a UV light emitting diode (LED), or the like.

In one embodiment, sources 201 and/or 202 may be configured to provide a beam that can be focused to provide a beam or spot at or near each capillary 101 having a diameter that is equal or approximately equal to an inner capillary diameter (e.g., a diameter twice the inner capillary diameter), preferably a diameter at or near the capillary that is less than the inner capillary diameter. It has been found that transmittance or absorption measurements can be made with better sensitivity with the use of a smaller beam/spot diameter at or near the capillary because, for example, a higher percentage of the beam is impacted by variations in transmittance or absorption of the sample, sample solution or other substance flowing through the inner capillary channel.

In a preferred embodiment, sources 201 and/or 202 are point sources. As used herein, the term "point source" refers to a source that produces a beam that can be focused to a spot (cross-section or slice of the beam at a particular location) at or near a capillary having a beam diameter that is less than or equal to the diameter of an inner channel of the capillary. As used herein, in the case of a source producing a beam having, or characterized by, a Gaussian shape (e.g., a laser source), the term "beam diameter" means the $1/e^2$ diameter of the beam at a particular location along the beam's optical path (e.g., at capillary 101). As used herein, in the case of a source producing a beam not having, or not characterized by, a Gaussian shape, the term "beam diameter" means a diameter of the smallest circle or aperture containing 85% of the energy or power in a cross-section of the beam at a particular location in the beam's optical path (e.g., at a capillary 101).

Source 203 comprises a visible light source providing visible light beam b3, for example, light having a nominal or peak output at a wavelength at or near 505 nm or some other wavelength within the visible light range. In some embodiments, source 203 is a visible broadband light source or a white light source. In certain embodiments, source 203 and beam b3 may further comprise at least some radiation in the UV and/or infrared wavelength band ranges. Source 203 and beam b3 may comprise a range of wavelengths, for example, a wavelength range suitable for exciting a plurality of dyes excited at different wavelengths (e.g., a wavelength range over all or part of the visible light wavelength range or a wavelength range also including radiation in the infrared and/or ultraviolet wavelength band). In certain embodiments, source 203 may comprise electromagnetic radiation in visible band, as well as in the ultraviolet, infrared, and/or near-infrared with sufficient energy to excite dyes sensitive to radiation in each of these ranges. Source 203 may comprise one or more of an incandescent lamp, a gas discharge lamp (e.g., Halogen lamp, Xenon lamp, Argon lamp, Krypton lamp, etc.), a light emitting diode (LED), a white light LED, an organic LED (OLED), a laser (e.g., chemical laser, excimer laser, semiconductor laser, solid state laser, Helium Neon laser, Argon laser, dye laser, diode laser, diode pumped laser, fiber laser, pulsed laser, continuous laser), or the like.

Multiple capillary illumination for UV transmittance or absorption measurements at the same UV wavelength has previously required the use of one or more UV sources such as a deuterium lamp, for example, in combination with a plurality of optical fibers located in front of a plurality of corresponding capillaries. There are various reasons for this. A typical deuterium lamp used in the art for UV absorption measurements in the CE context is very stable (low noise), but has limited power. In a multiple capillary UV absorption measurement system, it is generally important to limit crosstalk between adjacent capillaries. This may be achieved by using a small illumination spot size in each capillary relative to the capillary's cross-sectional area. With a deuterium lamp UV source, this typically requires use of a pinhole mask (or other mask) and/or fiber optics to achieve a sufficiently compact system. However, much of the lamp's power is wasted in such systems and/or multiple lamps are needed to sufficiently illuminate multiple capillaries. Also, because deuterium lamps have a broad-spectrum output of incoherent radiation, it is generally not possible to focus a beam down to a dimension that is less than or equal to the capillary channel diameter.

Some preferred embodiments of the invention disclosed herein solve the above problems by utilizing a UV laser or other UV source characterized by high intensity or power, narrow wavelength band, and/or coherent emission. One embodiment uses a UV laser that is approximately 100 times brighter than a typical deuterium lamp and is able to provide beam that may be focused to a spot at which the beam diameter is less than or equal to the inner channel diameter of a capillary, yet with a small numerical aperture or divergence. Thus, the initial illumination power of the UV laser source is greater than in prior systems using deuterium lamps and has more favorable optical characteristic (e.g., small focus diameter and divergence). Also, because a UV laser source can produce a beam with a much smaller diameter and numerical aperture than does a deuterium UV lamp, a sufficiently small illumination spot size on each capillary can be achieved using focusing rather than having to rely on, for example, a pinhole mask or fiber optic array. Thus, much less of the source's illumination power is wasted and the sensitivity to variations in transmittance/absorption of a capillary sample is improved, since all or most of the beam energy is transmitted through the inner capillary channel. Thus, some embodiments of the invention implement optics that divide a single UV laser beam into multiple beamlets and that then direct and focus respective beamlets onto respective capillaries with a sufficiently small illumination spot size to avoid cross talk and with sufficient illumination power for obtaining usable transmittance or absorption measurements. In some embodiments, other UV sources with these favorable characteristics may be used instead of, or in addition to, a UV laser (e.g., a UV light emitting diode).

A challenge to using UV lasers in CE applications, rather than deuterium lamps, is that lasers typically have a much higher source noise level. However, in some embodiments disclosed herein, this problem is addressed through the use of a reference capillary and a corresponding reference beam. Additionally, as will be further described below, detected electromagnetic radiation (e.g., UV radiation) from the reference beam may be used by a digital signal processing unit to reduce or remove noise from detected radiation of the other beams (corresponding to capillaries containing sample substances).

Tables 1-3 show optical characteristic of a UV laser having a Gaussian beam shape. Such beams may be used, for example, with capillaries having inner capillary channel diameters in the range of 50 micrometers to 200 micrometers to achieve the above discussed advantages.

TABLE 1

| Laser beam wavelength (nm) | 220 | 280 |
|---|---|---|
| Beam waist Diameter (um) | 10 | 10 |
| Numerical Aperture | 0.0140 | 0.0178 |
| Divergence (at z = zR; radians) | 0.0280 | 0.0357 |
| Divergence (at z = zR; degrees) | 1.60 | 2.04 |

TABLE 2

| Laser beam wavelength (nm) | 220 | 280 |
|---|---|---|
| Beam waist Diameter (um) | 20 | 20 |
| Numerical Aperture | 0.0070 | 0.0089 |
| Divergence (at z = zR; radians) | 0.0140 | 0.0178 |
| Divergence (at z = zR; degrees) | 0.80 | 1.02 |

TABLE 3

| Laser beam wavelength (nm) | 220 | 280 |
|---|---|---|
| Beam waist Diameter (um) | 40 | 40 |
| Numerical Aperture | 0.0035 | 0.0045 |
| Divergence (at z = zR; radians) | 0.0070 | 0.0089 |
| Divergence (at z = zR; degrees) | 0.40 | 0.51 |

Instrument 1000 further comprises optical detectors 291, 292, 293, and 294 and digital signal processing unit 290. Instrument 1000 may be adapted to either incorporate or be communicatively coupled with a user device 280, which comprises a processor, memory, storage, display, and/or user interface components (e.g. a display, keyboard and/or touch screen, etc.) allowing a user to receive, use, and/or display data generated by instrument 1000 and, in some embodiments, control and/or configure aspects of instrument 1000. Digital signal processing (DSP) unit 290 processes signals from one or more of detectors 291-294 to, among other things, remove signal noise to help the instrument and user device obtain data usable for determining and displaying transmittance/absorption and/or fluorescence measurements corresponding to substances processed by the instrument. It should be noted that, in various embodiments, a DSP unit such as DSP 290 might be implemented in hardware, software, or a combination of hardware and software. Also, a DSP unit might be implemented on a connected user device and/or within a detection subsystem or other subsystem of the instrument itself.

Optical detectors 291, 292, 293, and 294 may comprise one or more individual photodetectors including, but not limited to, photodiodes, photomultiplier tubes, semiconductor detectors, multiple channel PMTs, or the like. Additionally, or alternatively, optical detectors 291, 292, 293, and 294 may comprise an array sensor including an array of sensors or pixels. The array sensor may comprise one or more of a complementary metal-oxide-semiconductor sensor (CMOS), a charge-coupled device (CCD) sensor, a plurality of photodiodes detectors, a plurality of photomultiplier tubes, or the like. In certain embodiments, one or more of optical detectors 291, 292, 293, and 294 may comprise a spectrometer comprising an array detector and a dispersive element such as a reflection or transmission diffractive grating that spread incoming radiation into a spectrum across the detector array.

Sources 201-203, detectors 291-294, and DSP unit 290 are part of an optical detection subsystem of instrument 1000. Other components of the optical detection system include various optical components arranged to provide various optical paths for beams travelling from sources 201-203 to detectors 291-294. Those optical components and optical paths are illustrated and described below in the context of FIGS. 2-6 and accompanying text, but are not separately shown in FIG. 1.

In summary, instrument 1000 operates as follows: A sample mixture or solution containing various samples or sample molecules is prepared in or delivered into a sample source container 105. At least a portion of the sample mixture is introduced into one end of capillaries 101, for example, at the cathode 103 using a pump or syringe (not separately shown) or by applying a charge or electric field to capillaries 101. With the sample solution loaded into the cathode end of a capillary 101, voltage supply 104 creates a voltage difference between cathode 103 and anode 102. The voltage difference causes negatively charged, dye-labeled samples to move from sample source container 105 to sample destination container 106. Longer and/or less charged dye-labeled samples move at a slower rate than do shorter and/or higher charged dye-labeled samples, thereby creating some separation between samples of varying lengths and/or charges. Beams originating from UV source 201, UV source 202, and/or visible light source 203 pass through a location within the capillaries 101. Beams used for UV transmittance or absorption measurements pass through capillaries 101 and are subsequently imaged onto detectors 291 and/or 292. Fluorescence resulting from a UV beam exciting substances in capillaries 101 is directed to detector 293. Fluorescence resulting from a visible light beam exciting substances in capillaries 101 is directed to detector 294. In certain embodiments, UV sources 201 and/or UV source 202 may be replaced or supplemented by sources including other wavelength bands, for example, visible light, infrared, or near-infrared bands, for the purpose of making transmittance or absorption measurements within those wavelength bands.

Signals are provided from one or more of detectors 291-294 to DSP unit 290 for processing. Among other things, DSP 290 is configured to utilize signals corresponding to a reference capillary 101 to reduce noise in signals corresponding to other capillaries 101 through which samples to be measured pass. The output from DSP 290 is used by user device 280 or similar device to further process and display measurement results corresponding to measured samples.

FIG. 2 shows optical detection system 200 of instrument 1000 of FIG. 1 in accordance with an embodiment of the invention. The illustrated components provide multiple optical pathways from sources 201, 202, and 203 to capillaries 101. In FIG. 2, a cross section of nine different capillaries 101 is shown. From the perspective of the illustrations in FIGS. 2-6, capillaries 101 extend longitudinally along a dimension orthogonal to the illustration (i.e., into and out of the page).

The relevant optical pathways and optical components illustrated in FIG. 2 will now be described in further detail, starting the pathway from UV source 201 to detector 291.

Beam b1: UV Absorption Measurement

Figure 3:
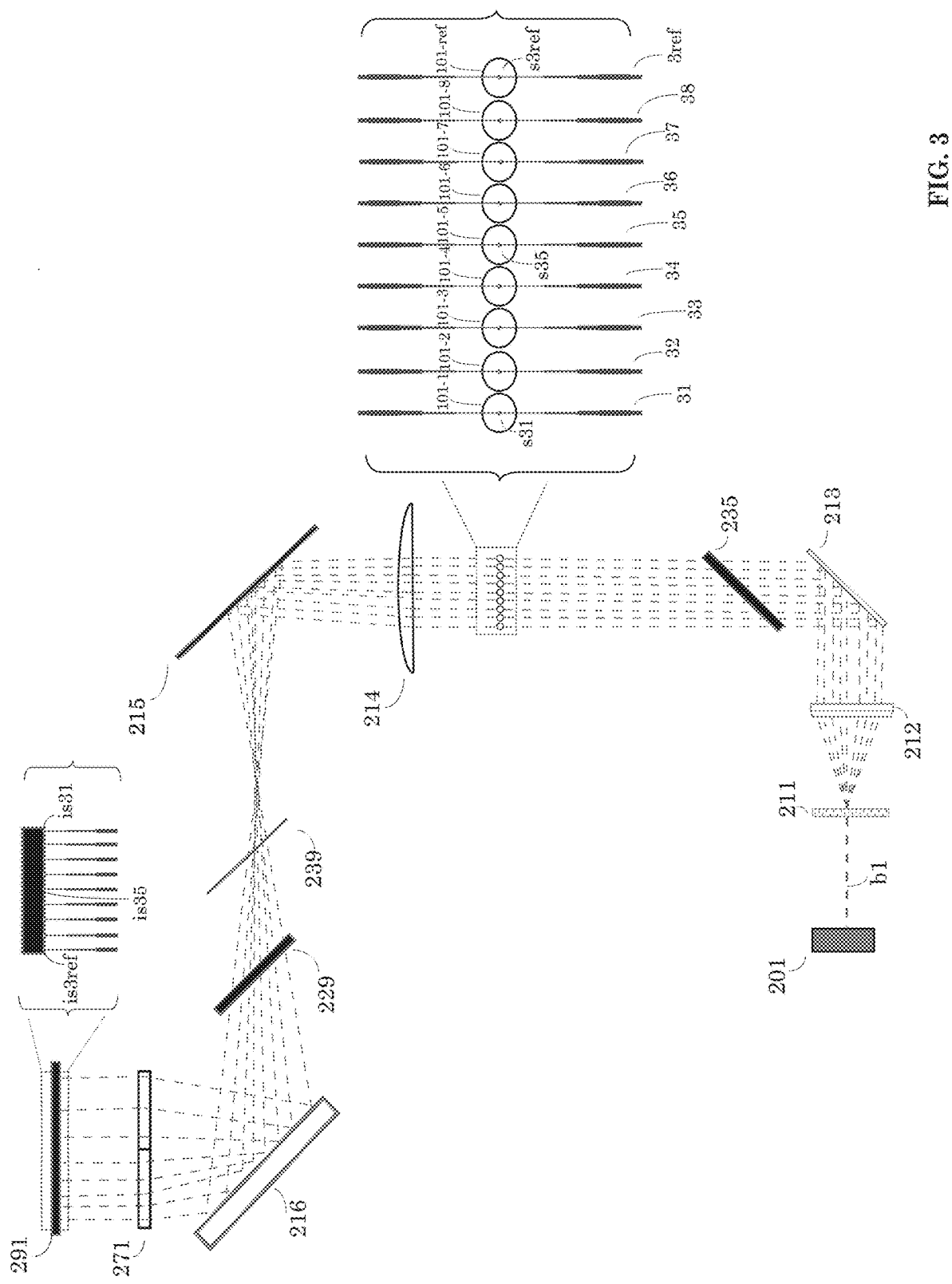
FIG. 3 illustrates certain additional details regarding the embodiment of FIG. 2.

As illustrated in FIG. 2 and in FIG. 3, UV source 201 emits UV beam b1. Beam b1 passes through diffractive optical element 211, which operates to split beam b1 into nine beamlets that may be collimated or approximately collimated using a lens 212. Diffractive optical element 211 may be optionally configured to otherwise condition the beamlets, for example, configured to change the convergence or divergence of one or more of the beamlets from that of beam b1. The beamlets are reflected by mirror 213 and passed through dichroic beam combiner 235. Dichroic beam combiner 235 combines beamlets originating from beam b1 of UV source 201, which operates at a first wavelength, and beamlets originating from beam b2 of UV source 202, which operates at a second wavelength.

The beamlets then pass through capillaries 101. In the illustrated embodiment, eight of the capillaries contain samples to be measured and the ninth capillary is used as a reference. The beamlets from beam b1 passing through capillaries 101 are used to measure absorption and/or transmittance, wherein a portion of each beamlet's power is absorbed by a corresponding sample-filled capillary 101 and another portion transmits through the corresponding capillary 101. In certain embodiments, a smaller portion of a reference beamlet's power is absorbed by a reference capillary 101 than through some or all of the remaining capillaries. The transmitted beamlets are focused by objective lens 214 and reflected by dichroic mirror 215 which reflects UV radiation and allows visible light to pass through it. In this way, the beamlets intersect one another and then diverge as they continue to propagate toward a mirror 216, while divergence of each beamlet individually may be decreased by lens 214. The UV beamlets then pass through dichroic mirror 239, which reflects fluorescent light resulting from excitation of the substances in capillaries 101 by beam b2 (as separately described further below). At dichroic mirror 229, the UV beamlets are separated by wavelength such that beamlets originating from beam b2 of UV source 202 are reflected and beamlets originating from beam b1 of UV source 201 pass through to mirror 216. Mirror 216 reflects the beamlets from b1 and directs them to imaging lens 271 which images them onto detector 291. In certain embodiments, a plurality of optical elements (not shown) are located between mirror 216 and detector 291 that each modify a respective one of the beamlets from b1.

Beam b2: Multiple Operational Modes

UV source 202 emits UV beam b2. In the illustrated embodiment, as previously described, UV source 202 operates at a different wavelength than does UV source 201. The illustrated optical arrangement allows optical detection system 200 to utilize multiple operating modes with respect to use of UV beam b2. In a first mode, UV beam b2 is utilized entirely for absorption measurements of samples in capillaries 101. In a second mode, UV beam b2 is utilized entirely for exciting fluorescence in samples in capillaries 101 and instrument 1000 then detects that fluorescence. In a third mode, UV beam b2 is divided in manner that allows a first portion of the beam to be used for absorption measurements and a second portion of the beam to be used, substantially simultaneously, for exciting fluorescence. In some embodiments, instead of using UV source 202 to make absorption measurements in capillaries 101, optical detection system 200 further comprises a separate source (e.g., UV source) for making absorption measurements. In such embodiments, optical elements 231 and 232 are not needed.

It should be noted that, in some embodiments, the disclosed system can be configured to switch from one mode to another between sample runs. Thus, a first sample run could be conducted with the instrument configured to implement the first mode referenced above, a second sample run could be conducted with the instrument configured to implement the second mode, and a third sample run could be conducted with the instrument configured to implement the third mode. In other embodiments, only the first or second mode could be implemented, but not the third mode. Also, in some embodiments implementing the third mode, the proportion of the original beam that is used for exciting fluorescence versus absorption measurements can be adjusted between sample runs. As will be appreciated by those skilled in the art, enabling reconfigurability of the instrument to operate in one mode versus another and/or to adjust the relative portion of beam b2's power allocated to absorption measurements versus fluorescence excitation, can be accomplished by, for example, using half wave plates in which the amount of polarization rotation applied by the half wave plate is adjustable.

Beam b2: UV Absorption Measurement

Figure 4:
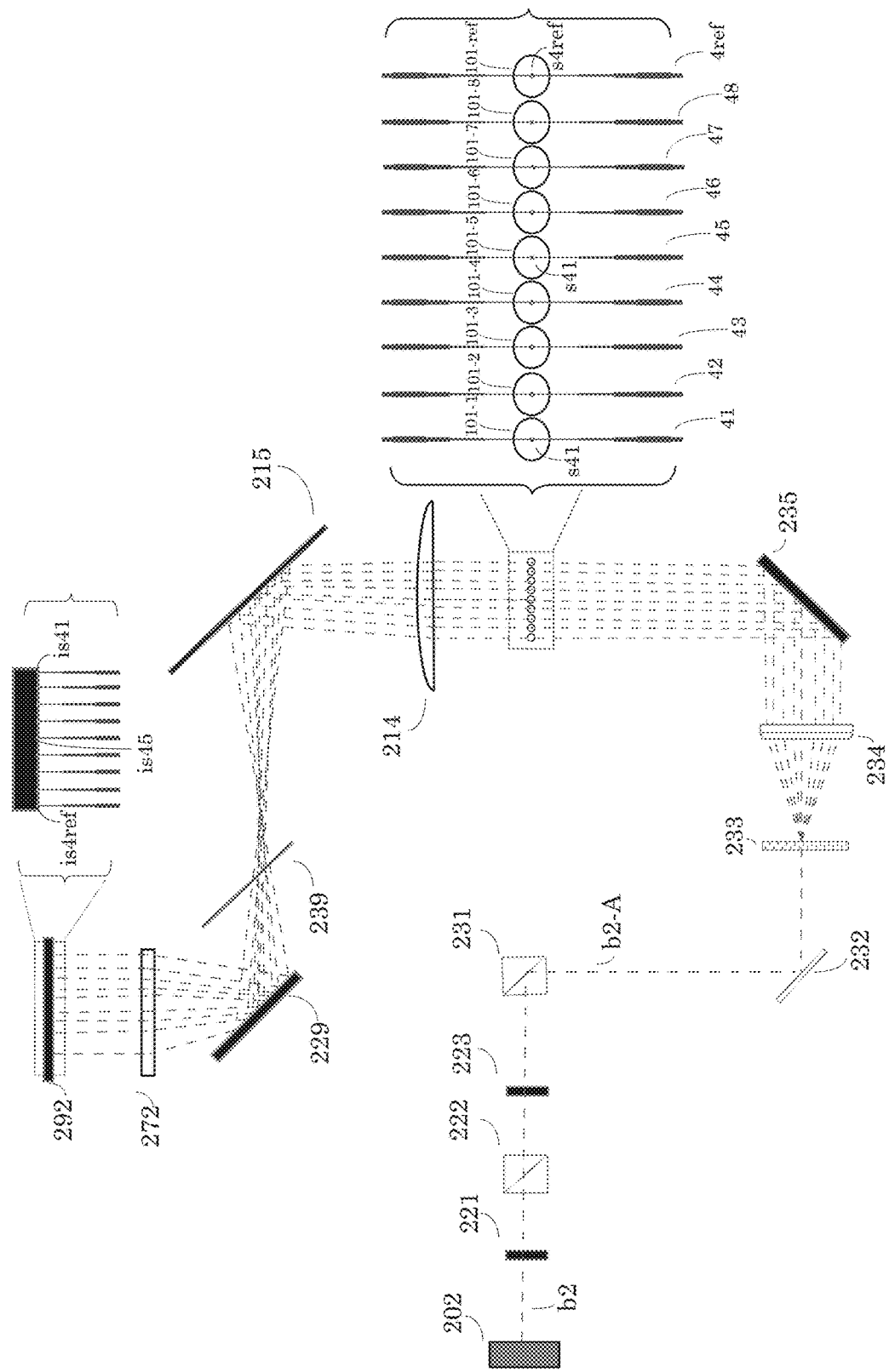
FIG. 4 illustrates certain additional details regarding the embodiment of FIG. 2.

As illustrated in FIG. 2 and in FIG. 4, in the first mode, beam b2 passes through half wave plate 221, polarizing beam splitter 222, and half wave plate 223 and is then reflected downward by polarizing beam splitter 231. The beam is labelled as beam b2-A in FIG. 2 after being reflected by polarizing beam splitter 231 simply to refer to the fact that the portion of beam b2 that is reflected by beam splitter 231 is used for absorption measurement. In the first mode, half wave plate 221, polarizing beam splitter 222, half wave plate 223, and polarizing beam splitter 223 are configured such that all or substantially all of beam b2's energy is present in beam b2-A.

Beam b2-A is reflected by mirror 232 and passes through diffractive optical element 233, which operates to split beam b2-A into nine beamlets that may be collimated or approximately collimated using a lens 234. Diffractive optical element 233 may be optionally configured to otherwise condition the beamlets, for example, configured to change the convergence or divergence of one or more of the beamlets from that of beam b1. The beamlets are redirected by dichroic beam combiner 235 to combine with beamlets originating from beam b1 (as described above) and pass through capillaries 101. The beamlets from beam b2 passing through capillaries 101 are used to measure absorption at a different wavelength than measured by those from beam b1.

As previously described, a portion of each beamlet's power is absorbed by a corresponding sample-filled capillary 101 and another portion transmits through the corresponding capillary 101. In certain embodiments, a smaller portion of a reference beamlet's power is absorbed by a reference capillary 101 than through some or all of the remaining capillaries. The transmitted beamlets are focused by objective lens 214 and reflected by dichroic mirror 215. In this way, the beamlets intersect one another and then diverge as they continue to propagate toward a mirror 216, while divergence of each beamlet individually may be decreased by lens 214. The UV beamlets then pass through dichroic mirror 239. As previously described, at dichroic mirror 229, the UV beamlets are separated by wavelength such that beamlets originating from beam b2 of UV source 202 are reflected. Dichroic mirror 229 directs the beamlets having beam b2's wavelength to imaging lens 272 which images them onto detector 292. In certain embodiments, a plurality of optical elements (not shown) are located between mirror 229 and detector 292 that each modify a respective one of the beamlets from b2.

Beam b2: UV Fluorescence Measurement

Figure 5:
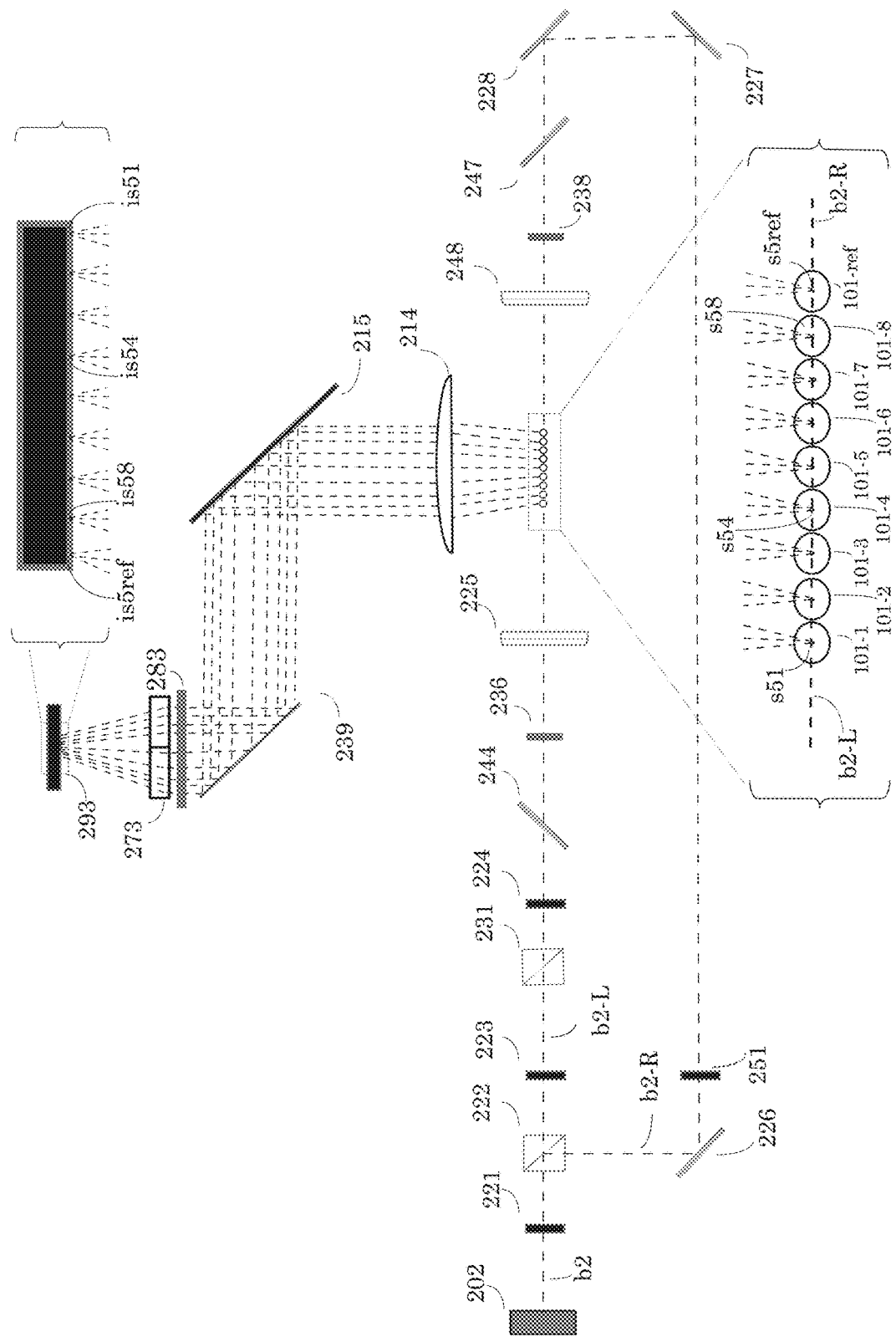
FIG. 5 illustrates certain additional details regarding the embodiment of FIG. 2.

As illustrated in FIG. 2 and in FIG. 5, in the second mode, half wave plate 221 and polarizing beam splitter 222 are configured to split beam b2 into two beams: b2-R and b2-L.

In one embodiment, beam b2 is split evenly into beams b2-R and b2-L. In other embodiments, the splitting ratio can be adjusted to implement a non-even split.

Beam b2-R is reflected by mirror 226 through half wave plate 251 and is then reflected by mirrors 227 and 228 before passing through dichroic mirror 247, and pinhole 238. Lens 248 then focuses the beam onto or near capillaries 101 and the beam propagates through capillaries 101 in a first direction (right to left from the standpoint of the illustrations of FIG. 2-6).

Beam b2-L passes through half wave plate 223, polarizing beam splitter 231, half wave plate 224, dichroic mirror 244, and pinhole 236. Lens 225 then focuses beam b2-L onto or near capillaries 101 and the beam propagates through capillaries 101 in a second direction, left to right from perspective of the illustration, opposite to that of the direction of b2-R. Splitting beam b2 into beam portions b2-L and b2-R and propagating each beam portion through the array of capillaries 101 in opposite direction allows more even excitation energy to be provided across the array of capillaries 101.

Fluorescence resulting from excitation of substances in each of the capillaries 101 by beams b2-L and b2-R is collected and collimated by objective lens 214. The collected fluorescence emission from each capillary 101 is then reflected by dichroic mirrors 215 and 239 to imaging lens 273. Imaging lens 273 images the fluorescence beams from each capillary 101 onto detector 293.

The detection system 200 may include a grating 283 on the optical path between dichroic mirror 239 and imaging lens 273 (alternatively, grating 283 may be located between lens 273 and detector 293). For many useful applications, the samples of interest will have native fluorescence in response to excitation by a UV beam that can be detected within a single narrow wavelength range. In such applications, a grating such as grating 283 will not be necessary. However, if the particular application benefits from detecting UV fluorescence in two or more different wavelength ranges, then grating 283 may be used to spread the beam over detector 293 based on wavelength. For example, grating 283 may be useful in applications that benefit from the ability to detect the presence different UV fluorescent labels on different sample fragments.

Beam b2: Simultaneous Absorption and Fluorescence

In a third mode, beam b2 is used for both absorption and fluorescence measurements substantially simultaneously. In this mode, half wave plate 221 and polarizing beam splitter 222 are configured to split beam b2 and pass a portion of through polarizing beam splitter 222 and to reflect another portion from polarizing beam splitter 222 to mirror 226 as beam b2-R. Beam b2-R then propagates in the manner described above in reference to the second mode. The portion of beam b2 that passes through polarizing beam splitter 222 passes through half wave plate 223 and is then further split at polarizing beam splitter 231 into two portions, b2-A and b2-L, based on the configuration of half wave plate 223. Beam b2-A propagates as described above in the context of the first mode (absorption). Beam b2-L propagates as described above in the context of the second beam b2 mode (fluorescent excitation).

In this third mode, beam b2's power is divided between multiple modes. Therefore, the portion of b2's power used for absorption and fluorescence excitation simultaneously is less than it is when the system is configured as described above to be used either entirely for one or the other, i.e., either entirely for the first mode (absorption measurement) or entirely for the second mode (fluorescence measurement).

Beam b3: Visible Fluorescence

Figure 6:
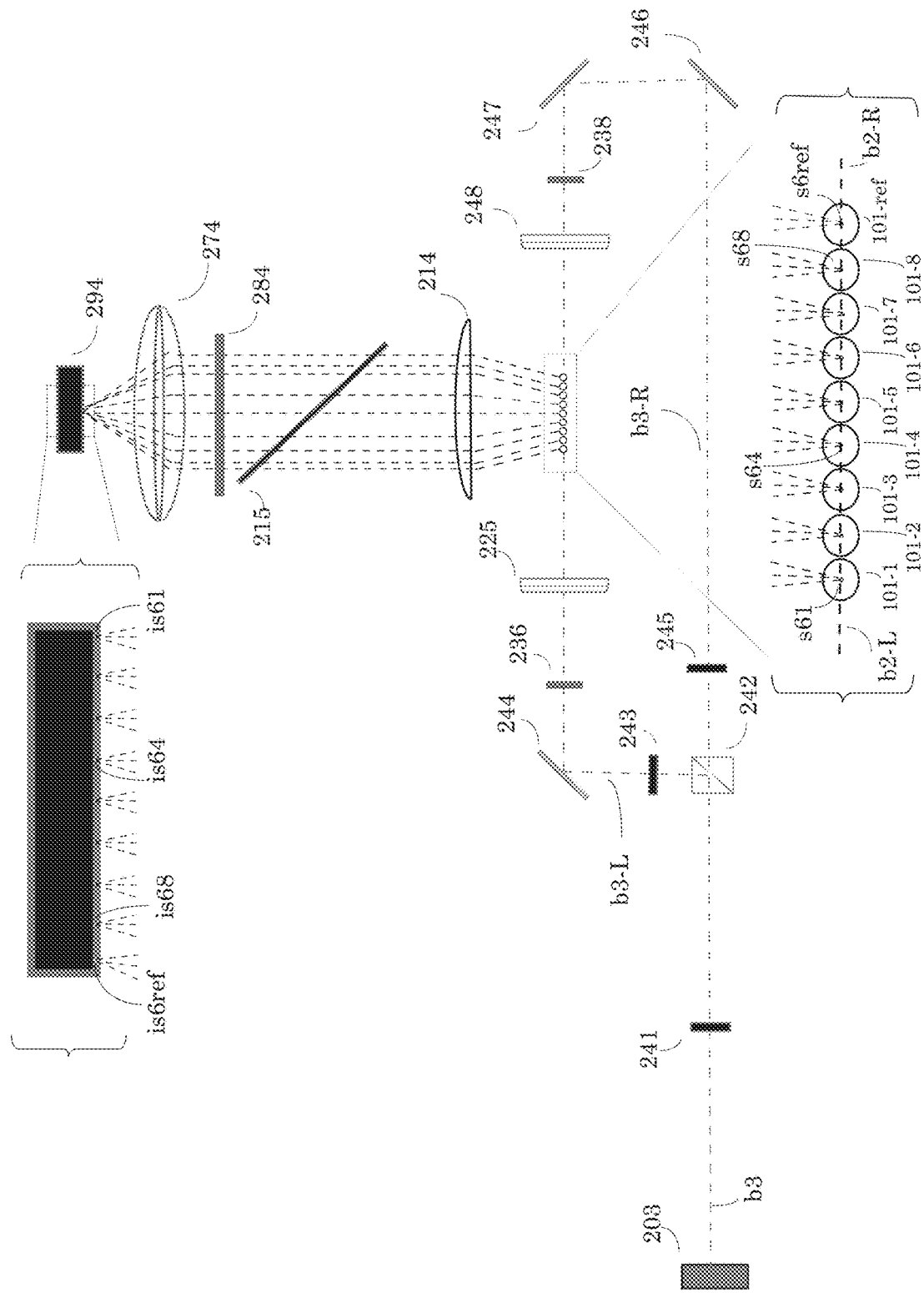
FIG. 6 illustrates certain additional details regarding the embodiment of FIG. 2.

As illustrated in FIG. 2 and in FIG. 6, visible light source 203 emits visible light beam b3. Half wave plate 241 and polarizing beam splitter 242 are configured to split beam b3 into two beams: b3-R and b3-L. In one embodiment, beam b2 is split evenly into beams b2-R and b2-L. In other embodiments, the splitting ratio can be adjusted to implement a non-even split.

Beam b3-R passes through half wave plate 245 and is reflected by mirror 246 and dichroic mirror 247. Dichroic mirror reflects beam b3-R through pinhole 238 to lens 248. Lens 248 then focuses the beam onto or near capillaries 101 and the beam propagates through capillaries 101 in a first direction (right to left from the standpoint of the illustrations of FIG. 2-6). Beam b3-L passes through half wave plate 243 and is reflected by dichroic mirror 244 through pinhole 236 to Lens 225. Lens 225 then focuses the beam onto or near capillaries 101 and the beam propagates through capillaries 101 in a second direction, left to right from perspective of the illustration, opposite to that of the direction of b3-R. Splitting beam b3 into beam portions b3-L and b3-R and propagating each beam portion through the array of capillaries 101 in opposite direction allows excitation energy to be provided across the array of capillaries 101 more evenly.

Fluorescence resulting from excitation of substances in capillaries 101 by beams b3-L and b3-R is collected and collimated by objective lens 214. It then passes through dichroic mirror 214 and transmission grating to imaging lens 274. Transmission grating 284 spreads the spectrum of visible beams across detector 294 and imaging lens 274 images the beams onto detector 294.

For fluorescent excitation beams originating from beams b2 (UV) and b3 (visible), pinholes (or beam masks) 236 and 238 can be used to block, respectively, the right-to-left propagating beams (b2-R and b3-R) and left-to-right propagating beams (b2-L and b3-L), as well as any back reflection from the capillary array resulting from those beams, from propagating back to sources 202 and 203. Blocking of the counter-propagating beams and back reflections by pinholes 236, 238 may be enhanced by use of an offset angle in the forward propagating beams.

Half wave plates 224, 251, 243, and 245 can be used to rotate polarization of beams b2-L (plate 224), b2-R (plate 251), b3-L (plate 243), and b3-R (plate 245). The polarization rotations imparted by plates 224 and 251 (on UV beams b2-L and b2-R) can be used to control Raman background emission intensity and/or to reduce laser beam back reflection. The polarization rotations imparted by plates 243 and 245 (on visible light beams b3-L and b3-R) can be used for back ground controlling and/or reducing laser beam back reflection.

Dichroic mirrors 244 and 247 couple UV and visible light beams used for exciting fluorescence of substances in capillaries 101. Specifically, dichroic mirror 244 coupled UV beam b2-L and visible light beam b3-L and dichroic mirror 247 couples UV beam b2-R and visible light beam b3-R.

Various Feature Combinations

The illustrated embodiment of optical detection system 200 embodies various different combinations of features. These various combinations, alone or together, each form potentially distinct embodiments and the use of some combinations do not necessarily require use of the other combinations. For example:

In one aspect, optical detection system 200 provides optical pathways allowing a single UV source to be used for one or both of absorption and fluorescence measurements. In another aspect, the single UV source can be used for both types of measurements simultaneously.

In another aspect, optical detection system 200 provides optical pathways allowing two UV sources at different wavelengths to be used for absorption measurements. In another aspect, at least some of the optical components along the pathways corresponding to UV absorption measurements relying on each source are shared.

In another aspect, at least some optical components along a pathway for exciting fluorescence by a UV beam and along a pathway for exciting fluorescence by a visible light beam are shared and at least some components along pathways for collecting and measuring fluorescence of substances in capillaries excited by those beams are shared.

In a fully combined aspect, optical components are configured and arranged in optical detection system 200 to do the following: Measure UV absorption of substances in an array of capillaries using two UV sources operating a different wavelengths; excite and measure fluorescence of substances in the array of capillaries using one of the two UV sources; and excite and measure fluorescence of substances in the array of capillaries using a visible light source. In another aspect, one or more of the two UV sources and/or the visible light source are configured to provide a point source, for example, a laser and one or more optical element to produce a point source. In a related aspect, reference beams and a reference capillary are used to generate a reference signal for use in removing noise from measurement signals corresponding to the other capillaries.

FIG. 3 illustrates, with some additional detail, the portion of optical detection system 200 that utilizes beam b1 for UV absorption measurements. Elements illustrated in FIG. 2 and FIG. 3 that have the same reference number are the same and will not necessarily be further described here if they have already been described above in the context of FIG. 2, except to the extent that their description is useful for explaining the additional details illustrated in FIG. 3.

FIG. 3 illustrates an exploded view of capillaries 101. The illustrated embodiment has nine capillaries including capillaries 101-1, 101-2, 101-3, 101-4, 101-5, 101-6, 101-7, 101-8, and 101-ref. Capillary 101-ref is used as a reference and does not contain biological samples. The other eight capillaries are used to convey sample solutions that contain samples to be analyzed. As previously described, diffractive optical element 211 operates to divide beam b1 into nine beamlets. Lens 212 operates to collimate or approximately collimate the beamlets relative to each other (i.e., direct them substantially parallel to each other) and also includes lenslets that operate to focus each beamlet individually. As shown in FIG. 3, diffractive optical element 211 and/or lens 212 may be configured to focus respective beamlets 31, 32, 33, 34, 25, 36, 37, 38, and 3ref onto or near respective capillary cores resulting in respective UV spots s31, s32, s33, s34, s35, s36, s37, s38, and s3ref. In one embodiment, each respective beamlet is focused such that its diameter decreases from 1 millimeter at lens 212 to approximately 10 microns at a respective capillary core. In other embodiments, other optical focusing powers can be used. The desired spot size or beam diameter at capillaries 101 (and hence the needed focusing power) will depend in part on the diameter of capillaries used for a particular implementation. In certain embodiments, one or more optical elements (not shown), such as one or more lenslets or diffractive optical elements, may be placed between source 201 and capillaries 101 to individually control the focus of one or more corresponding beamlets 31, 32, 33, 34, 25, 36, 37, 38, and/or 3ref.

Additionally or alternatively, one or more additional optical elements (not shown) may be placed at or near one or more of detectors 291, 292, 293, and/or 294 to individually control the focus of one or more corresponding beamlets 31, 32, 33, 34, 25, 36, 37, 38, and/or 3ref, In certain embodiments, one or more of beamlets 31, 32, 33, 34, 25, 36, 37, 38, and/or 3ref preferably come to focus or have a minimum diameter at or near capillaries 101.

FIG. 3 also illustrates an exploded view of a portion of detector 291. The optical components between the array of capillaries 101 and detector 291 serve to direct images of respective UV spots s31, s32, s33, s34, s35, s36, s37, s38, and s3ref onto detector 291 as respective image spots. To avoid overcomplicating the drawing, only images spots is31, is35, and is3ref are separately labelled. These are images of, respectively, UV spots s31, s35, and s3ref. Beamlet 3ref, and its corresponding UV spot s3ref on capillary 101-refs core, and image spot is3ref on detector 291 provide a reference signal that, in the illustrated embodiment, is used to remove noise from signals corresponding to the images of capillary core UV spots s31-s38 on detector 291, resulting from beamlets 31-38.

FIG. 4 illustrates, with some additional detail, the portion of optical detection system 200 that utilizes beam b2 for UV absorption measurements. Elements illustrated in FIG. 2 and FIG. 4 that have the same reference number are the same and will not necessarily be further described here if they have already been described above in the context of FIG. 2, except to the extent that their description is useful for explaining the additional details illustrated in FIG. 4.

As previously described, diffractive optical element 233 and lens 234 operate to divide beam b2 into nine beamlets. Lens 234 operates in a similar manner to that described above for lens 212 of FIG. 3. As shown in FIG. 4's exploded view of capillaries 101, respective beamlets 41, 42, 43, 44, 45, 46, 47, 48, and 4ref are focused onto respective capillary cores resulting in respective UV spots s41, s42, s43, s44, s45, s46, s47, s48, and s4ref.

FIG. 4 also illustrates an exploded view of a portion of detector 292. The optical components between the array of capillaries 101 and detector 292 serve to direct images of respective UV spots s41, s42, s43, s44, s45, s46, s47, s48, and s4ref onto detector 292 as respective image spots. To avoid overcomplicating the drawing, only images spots is41, is45, and is4ref are separately labelled. These are images of, respectively, UV spots s41, s45, and s4ref. Beamlet 4ref, and its corresponding UV spot s4ref on capillary 4ref's core, and image spot is4ref on detector 292 provide a reference signal that, in the illustrated embodiment, is used to remove noise from signals corresponding to the images of capillary core UV spots s41-s48 on detector 292, resulting from beamlets 41-48.

It is understood that when the system of the illustrated embodiment is operated to measure absorption using both beams b1 and b2, the illustrated beamlets in FIG. 3 and FIG. 4 are in fact respectively combined (e.g., beamlet 31 and 41 are combined) in the portion of the optical path between dichroic beam combiner 235 and dichroic mirror 239, including when transmitted through capillaries 101. In such case, the references in FIG. 3 and FIG. 4 to, for example beamlet 31 and 41, in fact refer to the relevant portions of a combined beamlet, the portions corresponding to, respectively, UV radiation at a first wavelength provided by source 201 (e.g., beamlet 31) and UV radiation at a different wavelength provided by source 202 (e.g., beamlet 41).

FIG. 5 illustrates, with some additional detail, the portion of optical detection system 200 that utilizes beam b2 for UV fluorescence measurements. Elements illustrated in FIG. 2 and FIG. 5 that have the same reference number are the same and will not necessarily be further described here if they have already been described above in the context of FIG. 2, except to the extent that their description is useful for explaining the additional details illustrated in FIG. 5.

As previously described, a portion of beam b2 that is not utilized for absorption measurements is split into beams b2-L and b2-R to illuminate capillaries 101 from opposite directions (left to right and right to left from the perspective of FIG. 5). As shown in FIG. 5's exploded view of capillaries 101, this illumination results in fluorescent emission corresponding to UV spots s51, s52, s53, s54, s55, s56, s57, s58, and s5ref.

FIG. 5 also illustrates an exploded view of a portion of detector 293. The optical components between the array of capillaries 101 and detector 293 serve to direct images of respective UV spots s51, s52, s53, s54, s55, s56, s57, s58, and s5ref onto detector 293 as respective image spots. To avoid overcomplicating the drawing, only images spots is51, is54, is58, and is5ref are separately labelled. These are images of, respectively, UV spots s51, s54, s58, and s5ref. UV spot s5ref, and image spot is5ref on detector 293 provide a reference signal that, in the illustrated embodiment, is used to remove noise from signals corresponding to the images of fluorescent emission UV spots s51-s58 on detector 293.

FIG. 6 illustrates, with some additional detail, the portion of optical detection system 200 that utilizes beam b3 for visible light fluorescence measurements. Elements illustrated in FIG. 2 and FIG. 6 that have the same reference number are the same and will not necessarily be further described here if they have already been described above in the context of FIG. 2, except to the extent that their description is useful for explaining the additional details illustrated in FIG. 6.

As previously described, beam b3 is split into beams b3-L and b3-R to illuminate capillaries 101 from opposite directions (left to right and right to left from the perspective of FIG. 6). As shown in FIG. 6's exploded view of capillaries 101, this illumination results in fluorescent emission corresponding to spots s61, s62, s63, s64, s65, s66, s67, s68, and s6ref.

FIG. 6 also illustrates an exploded view of a portion of detector 294. The optical components between the array of capillaries 101 and detector 294 serve to direct images of respective spots s61, s62, s63, s64, s65, s66, s67, s68, and s6ref onto detector 294 as respective image spots. To avoid overcomplicating the drawing, only images spots is61, is64, is68, and is6ref are separately labelled. These are images of, respectively, spots s61, s64, s68, and s6ref. Spot s6ref, and image spot is6ref on detector 294 provide a reference signal that, in the illustrated embodiment, is used to remove noise from signals corresponding to the images of fluorescent emission spots s61-s68 on detector 294.

It is understood that when the system of the illustrated embodiment is operated to measure fluorescence resulting from illumination by both beams originating from UV beam b2 and beams originating from visible beam b3, beams b2-L and b3-L are combined at dichroic mirror 244 and beams b2-R and b3-R are combined at dichroic mirror 247. Thus, for example, the references in FIG. 5 and FIG. 6 to beam b2-L and b3-L (or beam b3-L and b3-R) in fact refer to the relevant portions of a combined beam, the portions corresponding to, respectively, UV radiation originating from source 202 and visible light originating from source 203. Also, fluorescence emissions from capillaries 101 combine radiation at different wavelengths which is then separated at UV-visible light dichroic mirror 215 before being imaged onto, respectively, detectors 293 and 294.

Figure 7:
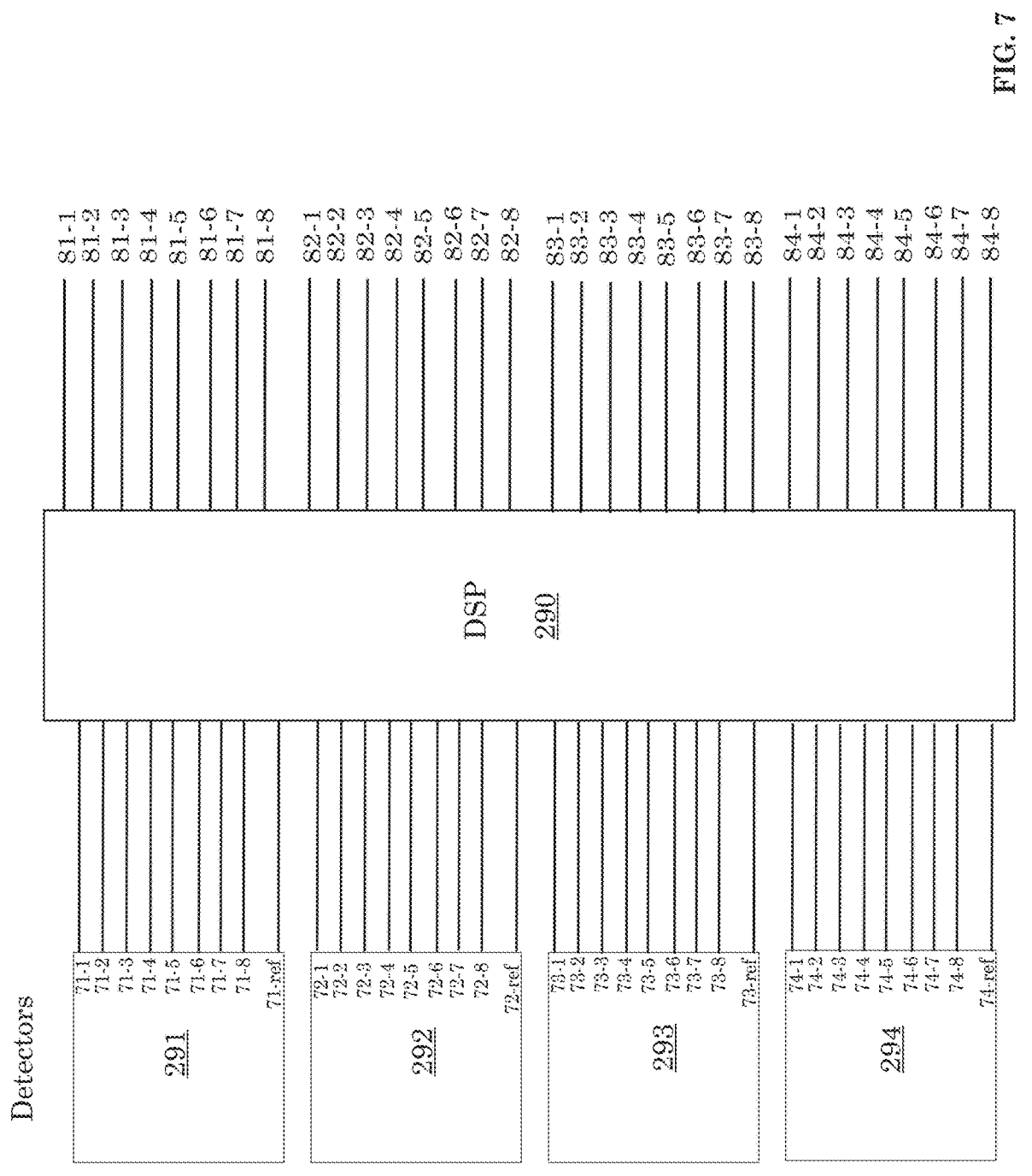

FIG. 7 is a block diagram illustrating signals output from detectors 291, 292, 293, 294 to DSP unit 290 and reduced noise signals output by DSP unit 290. As will be appreciated, the separate lines shown from the detectors to DSP unit 290 and shown as output from DSP unit 290 do not necessarily represent distinct hardware connections between (and outputs from) the illustrated elements. Rather, they simply represent distinct signal channels. In some embodiments, these separate signal channels might be implemented with physically separate connections; however, in other embodiments, they are implemented as separate signal channels conveyed over the same physical conduit.

Each detector outputs nine signals to DSP unit 290, i.e., one corresponding to each capillary measurement including measurement of eight capillaries comprising sample solutions and one reference capillary without any sample-filled solution. Detector 291 outputs to DSP 290 signals 71-1, 71-2, 71-3, 71-4, 71-5, 71-6, 71-7, 71-8, and 71-ref, corresponding to first wavelength UV absorption measurements of, respectively, capillaries 101-1, 101-2, 101-3, 101-4, 101-5, 101-6, 101-7, 101-8, and 101-ref. Signals 71-1 to 78-8 will include noise related to source 201, noise related to sample solutions, and noise related to the respective capillaries. Signal 71-ref will contain the noise related to source 201 and capillary 101-ref, but it will not contain noise related to samples. DPS unit 290 removes noise related to the source 201 and the capillaries from signals 71-1 to 71-8 by comparing them to reference signal 71-ref using, for example, a cross correlation technique employing methods such as Weiner filtering, least squares filtering, and/or other techniques to obtain DSP output signals 81-1, 81-2, 81-3, 81-4, 81-5, 81-6, 81-7. and 81-8 which have substantially reduced source and capillary related noise relative to signals 71-1 to 71-8.

Detector 292 outputs to DSP 290 signals 72-1, 72-2, 72-3, 72-4, 72-5, 72-6, 72-7, 72-8, and 72-ref, corresponding to second wavelength UV absorption measurements of, respectively, capillaries 101-1, 101-2, 101-3, 101-4, 101-5, 101-6, 101-7, 101-8, and 101-ref. Signals 72-1 to 72-8 will include noise related to source 202, noise related to sample solutions, and noise related to the respective capillaries. Signal 72-ref will contain the noise related to source 202 and capillary 101-ref, but it will not contain noise related to samples. DPS unit 290 removes noise related to the source and the capillaries from signals 72-1 to 72-8 by comparing them to reference signal 72-ref using, for example, the previously described techniques for removing signal noise. DSP 290 outputs signals 82-1, 82-2, 82-3, 82-4, 82-5, 82-6, 82-7. and 82-8 which have substantially reduced source and capillary related noise relative to signals 72-1 to 72-8.

Detector 293 outputs to DSP 290 signals 73-1, 73-2, 73-3, 73-4, 73-5, 73-6, 73-7, 73-8, and 73-ref, corresponding to UV fluorescence measurements of, respectively, capillaries 101-1, 101-2, 101-3, 101-4, 101-5, 101-6, 101-7, 101-8, and 101-ref. Signals 73-1 to 73-8 will include noise related to source 202, noise related to sample solutions, and noise related to the respective capillaries. Signal 73-ref will contain the noise related to source 202 and capillary 101-ref, but it will not contain noise related to samples. DPS unit 290 removes noise related to the source and the capillaries from signals 73-1 to 73-8 by comparing them to reference signal 73-ref using, for example, the previously described techniques for removing signal noise. DSP 290 outputs signals 83-1, 83-2, 83-3, 83-4, 83-5, 83-6, 83-7. and 83-8 which have substantially reduced source and capillary related noise relative to signals 73-1 to 73-8.

Detector 294 outputs to DSP 290 signals 74-1, 74-2, 74-3, 74-4, 74-5, 74-6, 74-7, 74-8, and 74-ref, corresponding to UV fluorescence measurements of, respectively, capillaries 101-1, 101-2, 101-3, 101-4, 101-5, 101-6, 101-7, 101-8, and 101-ref. Signals 74-1 to 74-8 will include noise related to source 202, noise related to sample solutions, and noise related to the respective capillaries. Signal 74-ref will contain the noise related to source 202 and capillary 101-ref, but it will not contain noise related to samples. DPS unit 290 removes noise related to the source and the capillaries from signals 74-1 to 74-8 by comparing them to reference signal 74-ref using, for example, the previously described techniques for removing signal noise. DSP 290 outputs signals 84-1, 84-2, 84-3, 84-4, 84-5, 84-6, 84-7. and 84-8 which have substantially reduced source and capillary related noise relative to signals 74-1 to 74-8.

DSP 290 can be implemented as processing logic in specifically configured hardware for example, in a Field Programmable Gate Array (FPGA) programmed for the relevant processing logic, in custom hardware, for example, in an Application Specific Integrated Circuit (ASIC), and/or in software executing on a special or general purpose processor (for example, on a processor of user device 280, or on a processor located elsewhere in instrument 1000).

While the present invention has been particularly described with respect to the illustrated embodiments, it will be appreciated that various alterations, modifications and adaptations may be made based on the present disclosure and are intended to be within the scope of the present invention.

Some examples of the many alternatives to the disclosed embodiments that could be implemented consistent with the spirit and scope of various aspects of the invention include, but are not limited to, the following: In some alternative embodiments, reflection rather than transmission optics (e.g., parabolic mirrors rather than lenses) can be used to direct the relevant beams onto the capillaries. In some embodiments, reflection rather than transmission optics could be used to direct the relevant beams onto the relevant detectors. In some alternative embodiments, optical fibers can be used to direct the relevant electromagnetic radiation onto the capillaries and/or to direct the relevant electromagnetic radiation onto the relevant detectors. In such optical fiber alternatives, many of the optical components illustrated in the FIGS. 2-6 would not be needed. In some embodiments, optical fibers could be used for the detection pathways (to direct light from the capillaries to the detectors) but not necessarily used for the illumination pathways (directing electromagnetic radiation from the source(s) to the capillaries).

In the illustrated embodiments, both transmittance/absorption measurements and fluorescent measurements are conducted based on illuminating the same window of a given capillary of the array. In other words, the same area of a capillary is targeted for illumination related to transmittance/absorption measurements and for illumination related to fluorescence measurements. However, in some alternative, separate windows could be used. For example, illumination for UV absorption measurements could occur at a first area of the capillary and illumination for fluorescence measurements could occur at a second area, longitudinally distant from the first area. In such embodiments, distinct optical paths would be implemented for each window and some of the separation optics of the embodiments illustrated in FIGS. 2-6 would not necessarily be needed.

These and other variations will be understood to be within the scope of the invention's potential embodiments.

While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the underlying principles of the invention as described by the various embodiments reference above and below.

The invention claimed is:

1. An optical detection system for a capillary electrophoresis instrument comprising:
an ultraviolet (UV) source;
an absorption measurement optical path comprising a first plurality of optical elements arranged to obtain a plurality of respective UV beamlets from a UV beam emitted by the UV source and to direct the respective UV beamlets transversely through respective capillaries of a plurality of capillaries and to an absorption detector positioned to detect respective signals for use in obtaining respective UV absorption measurements corresponding to the respective capillaries; and
a fluorescence excitation optical path different from the absorption measurement optical path comprising a second plurality of optical elements arranged to direct the UV beam transversely though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

2. The optical detection system of claim 1 wherein the second plurality of optical elements comprises at least some of the first plurality of optical elements.

3. The optical detection system of claim 1 wherein one or more optical elements of the first plurality of optical elements and the second plurality of optical elements are configurable to direct respective portions of the UV beam through the absorption measurement optical path and through the fluorescence measurement optical path substantially simultaneously.

4. The optical detection system of claim 1 wherein one or more optical elements of the first plurality of optical elements and the second plurality of optical elements are configurable to reconfigure the optical detection system between a first mode and a second mode, the first mode characterized by a configuration of the system in which the UV beam is directed on the absorption measurement optical path and the second mode characterized by a configuration of the system in which the UV beam is directed on the fluorescence measurement optical path.

5. The optical detection system of claim 1 wherein the UV source is a first UV source that operates at a first wavelength, the UV beam is a first UV beam, and the absorption measurement optical path is a first absorption measurement optical path, the optical detection system further comprising:
a second UV source that operates at a second wavelength; and
a second absorption measurement optical path comprising a third plurality of optical elements arranged to obtain a plurality of respective UV beamlets from a UV beam emitted by the second UV source and to direct the respective UV beamlets transversely through respective capillaries of a plurality of capillaries and to an absorption detector positioned to detect respective signals for use in obtaining respective UV absorption measurements corresponding to the respective capillaries.

6. The optical detection system of claim 1 further comprising:
a visible light source;
a fluorescence excitation optical path comprising a third plurality of optical elements arranged to direct a fluorescence excitation light beam from the visible light source transversely though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

7. The optical detection system of claim 1 wherein the UV source is a point source.

8. The optical detection system of claim 7 wherein one of the respective capillaries is designated as a reference capillary, the optical detection system further comprising:
a digital signal processing unit configured to use signals corresponding to the reference capillary to remove UV source and capillary signal noise from signals corresponding to other capillaries of the respective capillaries wherein the other capillaries are designated to carry samples.

9. The optical detection system of claim 1 wherein the first plurality of optical elements comprise a diffractive optical element used to obtain the respective UV beamlets from the UV beam.

10. An optical detection system for a capillary electrophoresis instrument comprising:
a first ultraviolet (UV) source that operates at a first wavelength;
a first absorption measurement optical path comprising a first plurality of optical elements arranged to obtain a plurality of first respective UV beamlets from a UV beam emitted by the first UV source and to direct the respective UV beamlets transversely through respective capillaries of a plurality of capillaries and to an absorption detector positioned to detect respective signals for use in obtaining respective UV absorption measurements corresponding to the respective capillaries;
a second UV source that operates at a second wavelength; and
a second absorption measurement optical path comprising a second plurality of optical elements arranged to obtain a plurality of second respective UV beamlets from a UV beam emitted by the second UV source and to direct the second respective UV beamlets transversely through respective capillaries of the plurality of capillaries and to an absorption detector positioned to detect respective signals for use in obtaining respective UV absorption measurements corresponding to the respective capillaries.

11. The optical detection system of claim 10 wherein the second plurality of optical elements comprises at least some of the first plurality of optical elements.

12. The optical detection system of claim 10 further comprising:
a fluorescence excitation optical path comprising a third plurality of optical elements arranged to direct a UV beam originated from the first UV source transversely though the plurality of capillaries and to direct respective fluorescence signals from the respective capillaries of the plurality of capillaries to a fluorescence detector positioned to detect the respective signals for use in obtaining respective fluorescence measurements corresponding to the respective capillaries.

13. The optical detection system of claim 12 wherein the third plurality of optical elements comprises at least some of the first plurality of optical elements.

14. The optical detection system of claim 10 further comprising:
a visible light source;
a fluorescence excitation optical path comprising a fourth plurality of optical elements arranged to direct a fluorescence excitation light beam from the visible light source transversely though the plurality of capillaries and to direct respective fluorescence signals from the respective capillaries of the plurality of capillaries to a visible light fluorescence detector positioned to detect the respective signals for use in obtaining respective fluorescence measurements corresponding to the respective capillaries.

15. The optical detection system of claim 14 wherein the fourth plurality of optical elements comprises at least some of the third plurality of optical elements.

16. The optical detection system of claim 10 wherein the first UV source and the second UV source are point sources.

17. The optical detection system of claim 16 wherein one of the respective capillaries is designated as a reference capillary, the optical detection system further comprising:
a digital signal processing unit configured to use signals corresponding to the reference capillary to remove UV source and capillary signal noise from signals corresponding to other capillaries of the respective capillaries wherein the other capillaries are designated to carry samples.

18. The optical detection system of claim 10 wherein the first plurality of optical elements comprises a diffractive optical element used to obtain the first respective UV beamlets from the first UV beam.

* * * * *